US012736621B2

(12) United States Patent
Saalfeld et al.

(10) Patent No.: US 12,736,621 B2
(45) Date of Patent: Sep. 15, 2026

(54) DEVICE AND METHOD FOR EMULATING A MOVING OBJECT IN A RADIO FREQUENCY (RF) CHANNEL

(71) Applicant: Rohde & Schwarz GmbH & Co. KG, Munich (DE)

(72) Inventors: Maximilian Saalfeld, Munich (DE); Mathias Leichtenstern, Munich (DE); Alois Ascher, Landshut (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 303 days.

(21) Appl. No.: 18/428,383

(22) Filed: Jan. 31, 2024

(65) Prior Publication Data

US 2025/0244445 A1 Jul. 31, 2025

(51) Int. Cl.
*G01S 7/40* (2006.01)
*G01S 7/41* (2006.01)

(52) U.S. Cl.
CPC .............. *G01S 7/4065* (2021.05); *G01S 7/41* (2013.01)

(58) Field of Classification Search
CPC ................................ G01S 7/4065; G01S 7/41
See application file for complete search history.

(56) References Cited

U.S. PATENT DOCUMENTS

2020/0310549 A1* 10/2020 Rani ...................... G06V 40/20
2023/0108944 A1* 4/2023 Chritton ................ G01S 7/4021 342/171
2025/0035741 A1* 1/2025 Mehdi ................... G01S 13/584
2025/0060450 A1* 2/2025 Choudhury ............ B64U 20/80
2025/0061748 A1* 2/2025 Sinharoy ................ G01S 7/415
(Continued)

FOREIGN PATENT DOCUMENTS

CN 116125412 B 6/2023

OTHER PUBLICATIONS

Iberle et al.; "A Near-Range Radar Target Simulator for Automotive Radar Generating Targets of Vulnerable Road Users"; IEEE Microwave and Wireless Components Letters; Oct. 26, 2020; pp. 1213-1216; vol. 30, No. 12; IEEE.
(Continued)

*Primary Examiner* — Nazra Nur Waheed
(74) *Attorney, Agent, or Firm* — Studebaker Brackett PLLC

(57) ABSTRACT

Disclosed are a device and method for emulating a moving object in a radio frequency, RF, channel. The device includes a receive terminal for receiving an RF signal; a tunable delay circuit for delaying the RF signal in accordance with a range indication associated with the moving object; a tunable attenuation circuit for attenuating the RF signal in accordance with a cross-sectional area indication associated with the moving object; a processor circuit for determining a Doppler frequency shift in accordance with a velocity indication associated with the moving object and micro-Doppler frequency shifts associated with the moving object; a tunable frequency shift circuit for frequency-shifting the RF signal in accordance with the Doppler frequency shift associated with the moving object; and an antenna array for transmitting the RF signal via the RF channel in accordance with an azimuth indication and an elevation indication associated with the moving object.

14 Claims, 3 Drawing Sheets

(56) References Cited

U.S. PATENT DOCUMENTS

2025/0164628 A1* 5/2025 Nishimura ............ G01S 7/4052
2025/0225712 A1* 7/2025 Cai ......................... G01S 7/415

OTHER PUBLICATIONS

Dubey et al.; "A Bayesian Framework for Integrated Deep Metric Learning and Tracking of Vulnerable Road Users Using Automotive Radars"; IEEE Access; May 5, 2021; pp. 68758-68777; vol. 9; IEEE.

Lutz et al.; "Target Simulator Concept for Chirp Modulated 77 GHz Automotive Radar Sensors"; 11th European Radar Conference; Oct. 8-10, 2014; pp. 65-68; EuMA; Rome, Italy.

Iberle et al.; "A Radar Target Simulator Concept for Close-Range Targets with Micro-Doppler Signatures"; 12th German Microwave Conference; Mar. 25-27, 2019; pp. 198-201; IMA e.V.; Stuttgart, Germany.

Diewald et al.; "Arbitrary Angle of Arrival in Radar Target Simulation"; IEEE Transactions on Microwave Theory and Techniques; Aug. 31, 2021; total 8 pages; vol. 70, No. 1; IEEE.

* cited by examiner

DEVICE AND METHOD FOR EMULATING A MOVING OBJECT IN A RADIO FREQUENCY (RF) CHANNEL

TECHNICAL FIELD

The present disclosure generally relates to radio detection and ranging (RADAR) echo generation, and in particular to devices and methods for emulating a moving object in an RF channel.

BACKGROUND ART

Testing radar systems is mandatory to ensure proper sensor functionality. Target emulation is an essential part of verifying the overall functionality of a radar system, and requires generation of virtual radar echoes of potentially moving objects by applying time delays, Doppler frequency shifts and attenuations in real-time and reproducibly. Though, today's RF channel emulators generate point targets only.

SUMMARY

It is an object to overcome the above-mentioned and other drawbacks.

The foregoing and other objects are achieved by the features of the independent claims. Further implementation forms are apparent from the dependent claims, the description and the figures.

A first aspect of the present disclosure relates to a device for emulating a moving object in a radio frequency, RF, channel. The device comprises a receive terminal for receiving an RF signal; a tunable delay circuit for delaying the RF signal in accordance with a range indication associated with the moving object; a tunable attenuation circuit for attenuating the RF signal in accordance with a cross-sectional area indication associated with the moving object; a processor circuit for determining a Doppler frequency shift in accordance with a velocity indication associated with the moving object and a plurality of micro-Doppler frequency shifts associated with the moving object; a tunable frequency shift circuit for frequency-shifting the RF signal in accordance with the Doppler frequency shift associated with the moving object; and an antenna array for transmitting the RF signal via the RF channel in accordance with an azimuth indication and an elevation indication associated with the moving object.

The device may further comprise a memory circuit, configured to store one or more object parameters of: the range indication associated with the moving object, the cross-sectional area indication associated with the moving object, the velocity indication associated with the moving object, the azimuth indication associated with the moving object, and the elevation indication associated with the moving object.

The processor circuit may further be arranged for retrieving the plurality of micro-Doppler frequency shifts from recordings.

The memory circuit may further comprise the recordings.

The processor circuit may further be arranged for retrieving the plurality of micro-Doppler frequency shifts in dependence of a motion description.

The processor circuit may further be arranged for providing the motion description in accordance with a signature description of the moving object, and/or an orientation of the moving object.

The memory circuit may further be configured to store one or more object parameters of: the signature description of the moving object, and the orientation of the moving object.

The processor circuit may further comprise a generative artificial intelligence, AI, model for providing the respective motion description.

The RF channel may form part of a plurality of multi-path RF channels differing in terms of the one or more object parameters; and the processor circuit may further be arranged for emulating the moving object in each of the plurality of multi-path RF channels.

The moving object may form part of a plurality of moving objects differing in terms of the one or more object parameters; and the processor circuit may further be arranged for emulating each of the plurality of moving objects in each of the respective plurality of multi-path RF channels.

The plurality of micro-Doppler frequency shifts of the respective multi-path RF channel may depend on its one or more object parameters.

The RF signal may comprise one of a RADAR signal, and a fifth-generation, 5G, 3GPP RF signal.

A second aspect of the present disclosure relates to a method for emulating a moving object in a radio frequency, RF, channel. The method comprises: receiving an RF signal; delaying the RF signal in accordance with a range indication associated with the moving object; attenuating the RF signal in accordance with a cross-sectional area indication associated with the moving object; determining a Doppler frequency shift in accordance with a velocity indication associated with the moving object and a plurality of micro-Doppler frequency shifts associated with the moving object; frequency-shifting the RF signal in accordance with the Doppler frequency shift associated with the moving object; and transmitting the RF signal via the RF channel in accordance with an azimuth indication and an elevation indication associated with the moving object.

A third aspect of the present disclosure relates to a system, comprising a device according to the first aspect for emulating a moving object in a radio frequency, RF, channel; and a sensor circuit for classifying the moving object in accordance with an RF signal received from the device.

Advantageous Effects

In the realm of radar technology, the ability to accurately simulate radar targets is crucial for the development and testing of radar systems. This is where the proposed channel/fading emulator with Micro-Doppler effects comes into play.

In a real-world scenario, a radar system would encounter various targets, each with its unique motion and structural characteristics. These characteristics influence the radar signal that bounces back to the radar receiver, creating a unique Doppler and Micro-Doppler signature for each target. For instance, a rotating helicopter blade or a moving human limb would each generate a distinct Micro-Doppler signature.

The proposed technology can simulate these unique signatures, thereby mimicking the radar targets in a realistic manner. By taking into account the environment/object signatures and translating them into motion types, the emulator can generate the Micro-Doppler effects associated with various targets. This includes the swinging of arms, the rotation of a turbine, or the vibration of a vehicle, among others.

Furthermore, the emulator can modify the Doppler frequency added to the signal so that it varies over time, reflecting the dynamic nature of real-world targets. Depending on the parameters such as range, resolution, and angle, the emulator can add the Micro-Doppler frequency components to one or more channels. This allows for the simulation of complex scenarios where a radar system might encounter multiple targets with different characteristics.

Moreover, the technology can simulate the effects of Micro-Doppler on other parameters. For example, the Micro-Doppler effect can change the Radar Cross Section (RCS), range, or angle of the target, thereby affecting the received radar signal. This further enhances the realism of the radar target simulation.

That is to say, the present disclosure applies micro-Doppler signatures to artificially generated objects in an RF channel emulator. For this purpose, features of special object types (such as, for example, arm movement of pedestrian, vibration of vehicle, rotation of turbine) are mapped onto one or more RF channels. In this way, points distributed in space with different motion patterns can be mapped and superimposed on one or more moving objects of the RF channel emulator with given characteristics (e.g. distance, angle, velocity, backscattering property).

In summary, this technology significantly improves the capabilities of radar target simulation by accurately mimicking the unique Doppler and Micro-Doppler signatures of various targets. This can greatly aid in the development and testing of radar systems, as it allows for realistic and comprehensive simulation scenarios.

The technical effects and advantages described herein equally apply to the device of the first aspect and the method of the second aspect having corresponding features.

BRIEF DESCRIPTION OF DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

Figure 1:
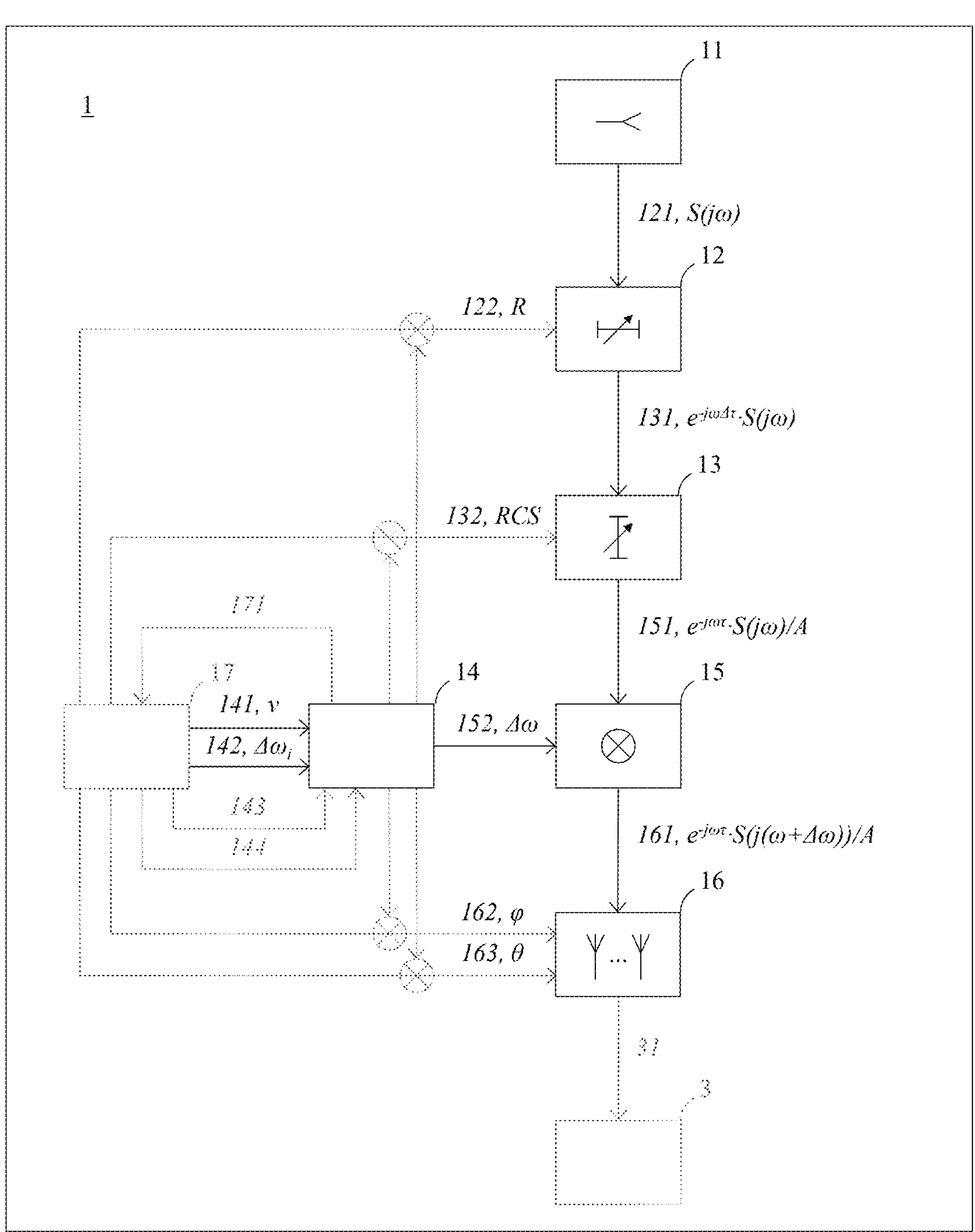

The drawings are to be regarded as being schematic representations, and elements illustrated in the drawings are not necessarily shown to scale. Rather, the various elements are represented such that their function and general purpose become apparent to those skilled in the art.

FIG. 1 illustrates a system in accordance with the present disclosure; and

Figure 2:
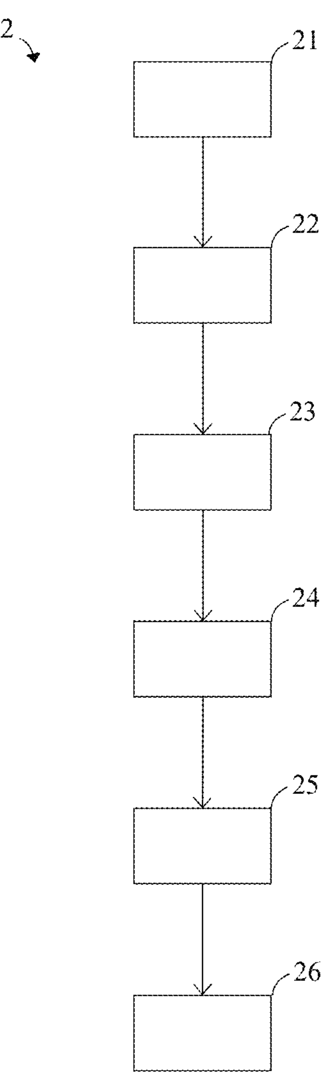

FIG. 2 illustrates a method in accordance with the present disclosure.

Figure 3:
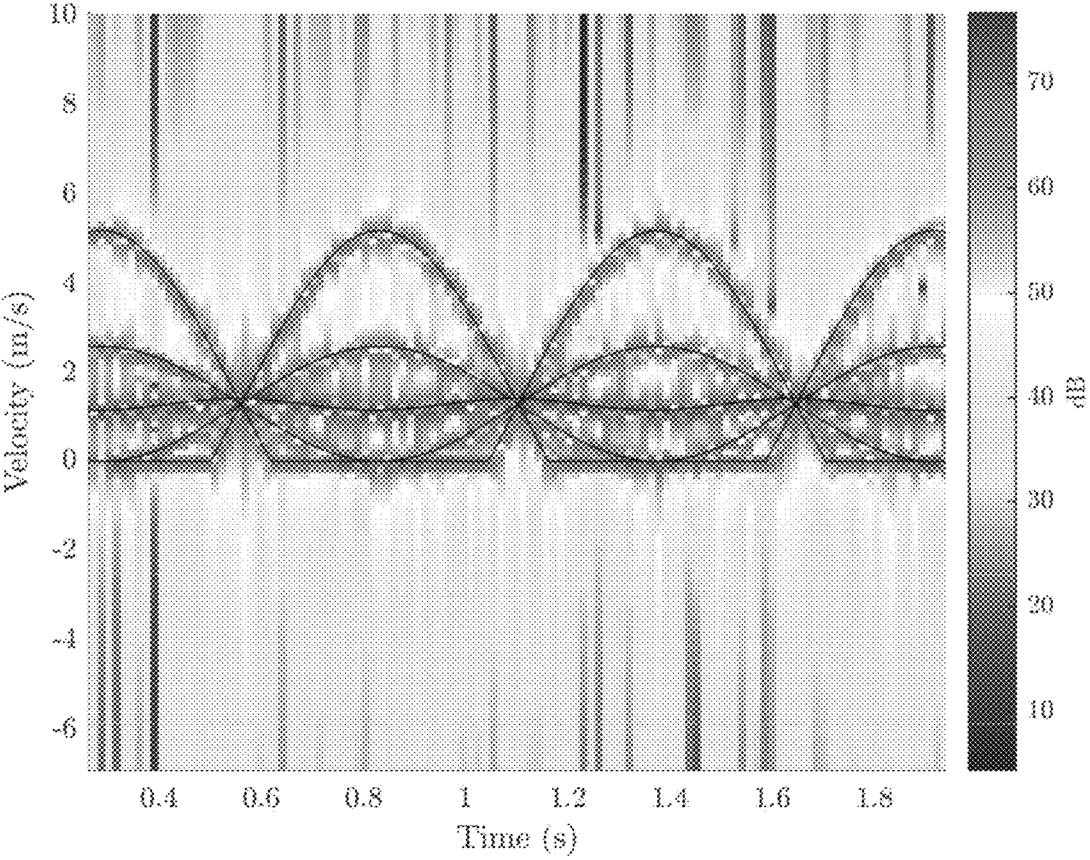

FIG. 3 illustrates a pedestrian micro-doppler signature model measurement.

DETAILED DESCRIPTIONS OF DRAWINGS

FIG. 1 illustrates a system 1, 3 in accordance with the present disclosure.

The system 1, 3 according to the third aspect of the present disclosure comprises the device 1 according to the first aspect and a sensor circuit 3.

The device 1 is arranged for emulating a moving object in an RF channel.

The device 1 operates by taking into account the environment and object signatures, which are essentially the unique characteristics or patterns associated with different objects or environments. These signatures can include aspects such as the shape, size, material, and motion of the object, as well as the characteristics of the environment in which the object is located.

As used herein, a moving object as used herein may refer to a radar target of various type, such as a human, a bicycle, a car, a helicopter, a drone, and the like.

As used herein, an RF channel may refer to a portion of a Gigahertz (GHz) frequency range.

The sensor circuit 3 is arranged for classifying the moving object in accordance with an RF signal 31 received from the device 1. The sensor circuit 3 may include an object detection/classification sensor for radar point clouds, for instance.

The device 1 comprises a receive terminal 11 for receiving an RF signal 121, $S(j\omega)$.

The RF signal 121, $S(j\omega)$ may comprise one of a RADAR signal, and a fifth-generation, 5G, 3GPP RF signal.

As used herein, radio detection and ranging or shortly RADAR may refer to a radio-based technique to detect targets and their properties such as a relative distance (ranging) and a relative velocity with respect to the observer, and a relative pivotation (azimuth, elevation) from a cardinal direction.

The device/may obtain the RF signal 121, $S(j\omega)$ through various methods, depending on the specific requirements of the scenario:

Direct Signal Acquisition: In this method, the device 1 directly acquires the RF signal 121, $S(j\omega)$ from the source. For instance, in a 5G network, the signal can be obtained from a 5G base station. In the case of radar signals, the signal can be directly captured from the radar transmitter.

Signal Generation: The device 1 can also generate the RF signal 121, $S(j\omega)$ internally. This can be done using a signal generator that can produce signals of various frequencies, amplitudes, and phases. The generated RF signal 121, $S(j\omega)$ can then be modulated to mimic the characteristics of a 5G or radar signal.

Signal Recording and Replay: In this method, the RF signal 121, $S(j\omega)$ is recorded during a real-world scenario and then replayed during the simulation. This allows the system to accurately replicate the conditions of the original scenario.

Signal Download: The device 1 can also download the RF signal 121, $S(j\omega)$ from a database or a cloud-based platform. This is particularly useful when the signal corresponds to a specific scenario or target that has been previously recorded.

Signal Extraction from a Mixed Signal: In some cases, the RF signal 121, $S(j\omega)$ may be part of a mixed signal that contains multiple signals. The system can use signal processing techniques to extract the RF signal 121, $S(j\omega)$ from the mixed signal.

Over-the-Air Signal Reception: The system can use an antenna to receive the RF signal 121, $S(j\omega)$ over the air. This method is particularly useful for capturing real-world signals in their natural environment.

Wired Signal Reception: The initial signal can also be obtained via a wired connection. This can be done by connecting the system to a signal source, such as a base station or a radar transmitter, using a coaxial cable or other types of signal transmission wires. This method ensures a stable and high-quality signal input for the channel emulator.

The device/further comprises a tunable delay circuit 12 for delaying the RF signal 121, $S(j\omega)$ in accordance with a range indication 122, R associated with the moving object; a tunable attenuation circuit 13 for attenuating the RF signal 131, $e^{-j\omega\Delta\tau}\cdot S(j\omega)$ in accordance with a cross-sectional area indication 132, RCS associated with the moving object; a processor circuit 14 for determining a Doppler frequency shift 152, $\Delta\omega$ in accordance with a velocity indication 141, v associated with the moving object and a plurality of micro-Doppler frequency shifts 142, $\Delta\omega_i$ associated with the moving object (individual micro-Doppler frequency shifts being distinguished by natural numbers i).

Note that depending on the particular emulation scenario the range indication 122, R associated with the moving object may take different values. In a reflection scenario, wherein transmission and reception of the RF signal 121, $S(j\omega)$ are deemed to take place at or close to a position of the sensor circuit 3, the range indication 122, R of the moving object may relate to an emulated line-of-sight distance between the moving object and the sensor circuit 3. In an obstruction scenario, wherein transmission and reception of the RF signal 121, $S(j\omega)$ are deemed to take place at the different positions of a transmitter (e.g., a 5G base station) and a receiver (i.e., the sensor circuit 3) and the moving object (e.g., an unmanned aerial vehicle, UAV, such as a drone) may partially obstruct a line of sight between said positions, the range indication 122, R associated the moving object may relate to an emulated signal path from the transmitter reflected partially off the moving object to the receiver.

As used herein, a Doppler frequency shift may refer to a frequency modulation on a returned (coherent) radar signal due to a velocity of the target, resulting from a shift of a carrier frequency of the signal known as the Doppler effect.

As used herein, micro-Doppler frequency shifts may refer to additional frequency modulations on a returned radar signal which generate sidebands about the target's Doppler frequency due to vibration, rotation or generally internal movement of structures of or on the target. A plurality of micro-Doppler frequency shifts may be referred to as a micro-Doppler signature and may be indicative of a type of the target or moving object.

The process of incorporating Micro-Doppler effects into the RF signal 121, $S(j\omega)$ involves modifying the Doppler frequency based on the motion characteristics of the object. This is because the Doppler frequency shift is not only a function of the relative speed between the source and the observer but also depends on the intrinsic motion of the object itself.

For example, FIG. 3 illustrates a pedestrian micro-doppler signature model measurement. Solid black lines represents an ideal signature of an approximate model of the pedestrian signature. For comparison, measured data represents the generated Doppler and micro-Doppler with a radar.

In the case of a rotating or vibrating object, for example, the Doppler frequency will vary over time due to the periodic motion of the object. This variation in Doppler frequency over time is what creates the Micro-Doppler effect.

To implement this in a signal processing system, the first step is to obtain a model of the object's motion. This could be a mathematical model derived from physical principles, or it could be a data-driven model obtained from measurements or simulations.

Once the motion model is obtained, it can be used to calculate the time-varying Doppler frequency shift. This involves calculating the relative speed between the source and the observer at each point in time, taking into account both the bulk motion of the object (e.g., its translation or rotation) and its intrinsic motion (e.g., the rotation or vibration of its parts).

The calculated Doppler frequency shift can then be used to modulate the signal. This can be done using a variety of signal processing techniques, such as frequency modulation, phase modulation, or complex baseband modulation.

The hardware required for this process could include a signal generator to produce the initial signal, a signal processor to calculate the Doppler frequency shift and modulate the signal, and a signal analyzer to verify the results. The signal processor could be a digital signal processor (DSP), a field-programmable gate array (FPGA), or a general-purpose processor (GPP), depending on the specific requirements of the task. The signal generator and analyzer could be standalone instruments, or they could be integrated into a software-defined radio (SDR) platform.

In a system designed to process and generate Micro-Doppler signatures, both analog and digital signal processing components may be used.

Micro-Doppler effects can indeed influence other parameters such as the Radar Cross Section (RCS), range, and angle of the target. Here's how:

Radar Cross Section (RCS): The cross-sectional area indication 132, RCS of the moving object (i.e., target) is a measure of how detectable an object is with radar. A larger RCS indicates that an object is more easily detectable. Micro-Doppler effects can influence the RCS because they are caused by the relative motion of different parts of the target. For example, the rotation of a helicopter's blades or the vibration of a car's engine can cause fluctuations in the RCS over time. This can make the target more or less detectable depending on the specific characteristics of the motion.

Range: The range indication 122, R of the moving object (i.e., target) is the distance from the radar to the target. Micro-Doppler effects can influence the range measurement because they cause a variation in the Doppler frequency shift, which is used to measure the range. For example, if a target is rotating, the parts of the target that are moving towards the radar will cause a positive Doppler shift, while the parts moving away from the radar will cause a negative Doppler shift. This can cause a spread in the measured Doppler frequencies, which can lead to an error in the range measurement.

Angle: The azimuth indication 162, $\varphi$ and elevation indication 163, $\theta$ of the moving object (i.e., target) represent the direction of the target relative to the radar. Micro-Doppler effects can influence the angle measurement because they cause a variation in the phase of the received signal, which is used to measure the angle. For example, if a target is rotating, the phase of the signal reflected from the target will vary over time. This can cause a spread in the measured phases, which can lead to an error in the angle measurement.

The influence of Micro-Doppler effects on the other parameters is indicated in FIG. 1 by optional multiplier symbols being driven by the processor circuit 14. In order to mitigate these effects, advanced signal processing techniques can be used. For example, time-frequency analysis techniques can be used to separate the Micro-Doppler effects from the bulk motion of the target, allowing for more accurate measurement of the RCS, range, and angle.

The device/further comprises a tunable frequency shift circuit 15 for frequency-shifting the RF signal 151, $e^{-j\omega\Delta\tau}\cdot S(j\omega/A)$ in accordance with the Doppler frequency shift 152, $\Delta\omega$ of the moving object.

The device 1 further comprises an antenna array 16 for transmitting the RF signal 161, $e^{-j\omega\Delta\tau}\cdot S(j(\omega+\Delta\omega/A)$ via the RF channel in accordance with an azimuth indication 162, $\varphi$ and an elevation indication 163, $\theta$ of the moving object. This may be referred to as electronic beam steering.

As shown on the left of FIG. 1, the device 1 may further comprise a memory circuit 17, configured to store one or more object parameters of: the range indication 122, R of the moving object, the cross-sectional area indication 132, RCS of the moving object, the velocity indication 141, ν of the moving object, the azimuth indication 162, φ of the moving object, and the elevation indication 163, θ of the moving object.

A record-replay method can also be used. In this method, a specific Micro-Doppler type is recorded and then superimposed on the signal with its primary Doppler. This allows for the accurate replication of specific Micro-Doppler effects, which can be particularly useful for testing and validation purposes.

Thus, the processor circuit 14 may further be arranged for retrieving the plurality of micro-Doppler frequency shifts 142, $\Delta\omega_i$ from recordings. Accordingly, the memory circuit 17 may further comprise said recordings. The processor circuit 14 may further be arranged for retrieving a motion description 171 or a signature description 143 of the moving object from recordings as well. The memory circuit 17 may further comprise such recordings as well.

The processor circuit 14 may further be arranged for retrieving the plurality of micro-Doppler frequency shifts 142, $\Delta\omega_i$ in dependence of the motion description 171, such as swinging, rotating, vibrating, and the like. Signatures can include aspects such as the shape, size, material, and motion of the object, as well as the characteristics of the environment in which the object is located. Signatures may be classified, i.e., categorized them into different classes based on their characteristics. For example, the motion of a rotating helicopter blade might be classified as "rotational motion", while the motion of a swinging pendulum might be classified as "oscillatory motion". Once the signatures are classified, they are mapped onto pre-defined models. These models represent different types of motion and are designed to mimic the behavior of real-world objects. For example, a "rotational motion" model might simulate the motion of a rotating object, while an "oscillatory motion" model might simulate the motion of a swinging object.

The processor circuit 14 may further be arranged for providing said motion description 171 in accordance with the signature description 143 of the moving object, such as Human-Head, Human-Arm, Bicycle-Wheel, etc., and/or an orientation 144 of the moving object, such as vertical, horizontal, etc. Accordingly, the memory circuit 17 may further be configured to store one or more object parameters of: the signature description 143 of the moving object, and the orientation 144 of the moving object.

AI techniques can also be used to create the Micro-Doppler signature. For instance, a generative artificial intelligence, AI, algorithm can be trained on a dataset of different signatures and can then generate new signatures that mimic the characteristics of the training data. This can allow for the creation of more complex and realistic Micro-Doppler signatures.

AI models used for generating Micro-Doppler signatures can be trained using supervised learning, unsupervised learning, or reinforcement learning, depending on the specific requirements of the task. Here are some options:

Supervised Learning: In this approach, the AI model is trained on a labeled dataset, where each example in the dataset consists of a Micro-Doppler signature and its corresponding label. The label could be the type of motion (e.g., "rotational", "oscillatory"), the type of object (e.g., "helicopter", "car"), or any other relevant characteristic. The AI model learns to predict the label given the Micro-Doppler signature. This could be achieved using a variety of AI models, such as convolutional neural networks (CNNs), which are particularly effective for pattern recognition tasks.

Unsupervised Learning: In this approach, the AI model is trained on an unlabeled dataset of Micro-Doppler signatures. The model learns to identify patterns or structures in the data without any prior knowledge about the labels. This could be achieved using clustering algorithms, which group similar signatures together, or autoencoders, which learn to reconstruct the input data and can be used to generate new data.

Reinforcement Learning: In this approach, the AI model learns to generate Micro-Doppler signatures by interacting with a dynamic environment. The model receives feedback in the form of rewards or penalties based on the quality of the generated signatures, and it learns to improve its performance over time. This could be achieved using deep reinforcement learning algorithms, which combine deep learning techniques with reinforcement learning.

The training data for these AI models could be obtained from various sources, such as real-world measurements, simulations, or synthetic data generation. The data would need to be preprocessed and, in the case of supervised learning, labeled accurately. The labeling process could involve manual annotation by experts, semi-automatic annotation using rule-based systems, or automatic annotation using other AI models.

Thus, the processor circuit 14 may further comprise a generative AI model for providing the respective motion description 171. For instance, a training of the AI model may involve supervised learning based on the signature description 143 of the moving object and/or the orientation 144 of the moving object as input data and the motion description 171 as output/label data.

The processor circuit 14 may further comprise a further AI model for providing the plurality of micro-Doppler frequency shifts 142, $\Delta\omega_i$. For instance, a training of the further AI model may involve supervised learning based on the signature description 143 of the moving object and/or the orientation 144 of the moving object as input data and the plurality of micro-Doppler frequency shifts 142, $\Delta\omega_i$ as output/label data.

In an advanced implementation, the RF channel may form part of a plurality of multi-path RF channels differing in terms of the one or more object parameters such as azimuth, elevation, range, etc.; and the processor circuit 14 may further be arranged for emulating the moving object in each of the plurality of multi-path RF channels.

In a further advanced implementation, the moving object may form part of a plurality of moving objects differing in terms of the one or more object parameters; and the processor circuit 14 may further be arranged for emulating each of the plurality of moving objects in each of the respective plurality of multi-path RF channels.

Mapping an object to a single or multiple channels refers to the process of assigning different parts or aspects of the object's signal to different channels for processing. This can be done in a variety of ways, depending on the specific requirements of the task.

Single Channel Mapping: In this case, the entire signal from the object is processed in a single channel. This is simpler and requires less computational resources compared to multi-channel processing. It is suitable for objects with simple motion characteristics that can be adequately represented by a single Doppler shift. For example, a car moving in a straight line at a constant speed can be represented by a single Doppler shift, and therefore can be processed in a single channel.

Multi-Channel Mapping: In this case, different parts or aspects of the object's signal are processed in different channels. This allows for a more detailed representation of the object's motion characteristics. For example, a helicopter with rotating blades has a complex motion that can be represented by multiple Doppler shifts. By processing the signals from the body and the blades in separate channels, the system can obtain a more accurate representation of the helicopter's motion.

The advantage of multi-channel mapping is that it allows for a more detailed and accurate representation of complex objects. It can also improve the system's ability to distinguish between different objects. For example, a system that uses multi-channel processing could distinguish between a car and a helicopter based on the different patterns of Doppler shifts in their signals.

However, multi-channel mapping also has its disadvantages. It requires more computational resources and can be more complex to implement compared to single-channel mapping. It may also be more susceptible to interference, as the signals in different channels can interfere with each other.

In general, the choice between single-channel and multi-channel mapping depends on the specific requirements of the task, including the complexity of the objects being modeled, the available computational resources, and the desired level of accuracy.

In particular, the plurality of micro-Doppler frequency shifts 142, $\Delta\omega_i$ of the respective multi-path RF channel may depend on its one or more object parameters.

FIG. 2 illustrates a method 2 in accordance with the present disclosure.

The method 2 is arranged for emulating a moving object in an RF channel, corresponding to the aforementioned device 1.

The method 2 comprises a step of receiving 21 an RF signal 121, $S(j\omega)$.

The method 2 further comprises a step of delaying 22 the RF signal 121, $S(j\omega)$ in accordance with a range indication 122, R of the moving object.

The method 2 further comprises a step of attenuating 23 the RF signal 131, $e^{-j\omega\Delta\tau}\cdot S(j\omega)$ in accordance with a cross-sectional area indication 132, RCS of the moving object.

The method 2 further comprises a step of determining 24 a Doppler frequency shift 152, $\Delta\omega$ in accordance with a velocity indication 141, v of the moving object and a plurality of micro-Doppler frequency shifts 142, $\Delta\omega_i$ of the moving object.

The method 2 further comprises a step of frequency-shifting 25 the RF signal 151, $e^{-j\omega\Delta\tau}\cdot S(j\omega/A)$ in accordance with the Doppler frequency shift 152, $\Delta\omega$ of the moving object.

The method 2 further comprises a step of transmitting 26 the RF signal 161, $e^{-j\omega\Delta\tau}\cdot S(j(\omega+\Delta\omega)/A)$ via the RF channel in accordance with an azimuth indication 162, $\varphi$ and an elevation indication 163, $\theta$ of the moving object.

The invention claimed is:

1. A device for emulating a moving object in a radio frequency, RF, (RF) channel, the device comprising a receive terminal for receiving an RF signal;

a tunable delay circuit for delaying the RF signal in accordance with a range indication associated with the moving object;

a tunable attenuation circuit for attenuating the RF signal in accordance with a cross-sectional area indication associated with the moving object;

a processor circuit for determining a Doppler frequency shift in accordance with a velocity indication associated with the moving object and a plurality of micro-Doppler frequency shifts associated with the moving object;

a tunable frequency shift circuit for frequency-shifting the RF signal in accordance with the Doppler frequency shift associated with the moving object, and for applying the plurality of micro-Doppler frequency shifts to the RF signal such that the micro-Doppler frequency shifts generate sidebands about a Doppler-shifted frequency of the RF signal; and an antenna array for transmitting the RF signal via the RF channel in accordance with an azimuth indication and an elevation indication associated with the moving object.

2. The device of claim 1, further comprising a memory circuit, configured to store one or more object parameters of:

the range indication associated with the moving object, the cross-sectional area indication associated with the moving object, the velocity indication associated with the moving object, the azimuth indication associated with the moving object, and the elevation indication associated with the moving object.

3. The device of claim 2, the processor circuit further being arranged for retrieving the plurality of micro-Doppler frequency shifts from recordings.

4. The device of claim 3, the memory circuit further comprising the recordings.

5. The device of claim 2, the processor circuit further being arranged for retrieving the plurality of micro-Doppler frequency shifts in dependence of a motion description.

6. The device of claim 5, the processor circuit further being arranged for providing the motion description in accordance with a signature description of the moving object, and/or an orientation of the moving object.

7. The device of claim 6, the memory circuit further configured to store one or more object parameters of:

the signature description of the moving object, and the orientation of the moving object.

8. The device of claim 6, the processor circuit comprising a generative artificial intelligence (AI) model for providing the respective motion description.

9. The device of claim 2, the RF channel forming part of a plurality of multi-path RF channels differing in terms of the one or more object parameters; and the processor circuit further being arranged for emulating the moving object in each of the plurality of multi-path RF channels.

10. The device of claim 9, the moving object forming part of a plurality of moving objects differing in terms of the one or more object parameters; and the processor circuit further being arranged for emulating each of the plurality of moving objects in each of the respective plurality of multi-path RF channels.

11. The device of claim 9, the plurality of micro-Doppler frequency shifts of the respective multi-path RF channel depending on its one or more object parameters.

12. The device of claim 1, the RF signal comprising one of:

a radio detection and ranging (RADAR) signal, and a fifth-generation (5G), 3GPP RF signal.

13. A system, comprising a device for emulating a moving object in a radio frequency (RF) channel according to claim 1; and a sensor circuit for classifying the moving object in accordance with an RF signal received from the device.

14. A method for emulating a moving object in a radio frequency (RF) channel, the method comprising:

receiving an RF signal;

delaying the RF signal in accordance with a range indication associated with the moving object;

attenuating the RF signal in accordance with a cross-sectional area indication associated with the moving object;

determining a Doppler frequency shift in accordance with a velocity indication associated with the moving object and a plurality of micro-Doppler frequency shifts associated with the moving object;

frequency-shifting the RF signal in accordance with the Doppler frequency shift associated with the moving object;

applying the plurality of micro-Doppler frequency shifts to the RF signal such that the micro-Doppler frequency shifts generate sidebands about a Doppler-shifted frequency of the RF signal; and transmitting the RF signal via the RF channel in accordance with an azimuth indication and an elevation indication associated with the moving object.

* * * * *